United States Patent
Seigler et al.

(10) Patent No.: US 9,373,348 B2
(45) Date of Patent: Jun. 21, 2016

(54) STORAGE MEDIUM WITH LAYER(S) FOR ENHANCED HEATING

(71) Applicant: Seagate Technology LLC, Cupertino, CA (US)

(72) Inventors: Michael Seigler, Eden Prairie, MN (US); Weibin Chen, Edina, MN (US); Werner Scholz, Edina, MN (US); Jan Ulrich Thiele, Sunnyvale, CA (US); Lihong Zhang, Science Park (SG); Xiong Liu, Singapore (SG); Shashwat Shukla, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 90 days.

(21) Appl. No.: 14/087,785

(22) Filed: Nov. 22, 2013

(65) Prior Publication Data

US 2015/0147592 A1   May 28, 2015

(51) Int. Cl.
| | |
|---|---|
| G11B 7/24 | (2013.01) |
| G11B 5/72 | (2006.01) |
| G11B 5/00 | (2006.01) |
| G11B 5/82 | (2006.01) |

(52) U.S. Cl.
CPC ... *G11B 5/72* (2013.01); *G11B 5/82* (2013.01); G11B 2005/0021 (2013.01); G11B 2220/23 (2013.01); *Y10T 428/11* (2015.01); *Y10T 428/115* (2015.01); *Y10T 428/1164* (2015.01); *Y10T 428/1193* (2015.01)

(58) Field of Classification Search
CPC .......... G11B 5/72; G11B 5/82; Y10T 428/11; Y10T 428/115; Y10T 428/1164; Y10T 428/1193

See application file for complete search history.

(56) References Cited

U.S. PATENT DOCUMENTS

| | | | |
|---|---|---|---|
| 6,982,844 B2 | 1/2006 | Rettner et al. | |
| 7,251,089 B2 | 7/2007 | Peng | |
| 7,638,210 B2 * | 12/2009 | Berger et al. | 428/828 |
| 7,796,353 B2 | 9/2010 | Schabes et al. | |
| 7,957,099 B2 | 6/2011 | Tanaka et al. | |
| 7,961,417 B2 | 6/2011 | Seigler et al. | |
| 8,351,305 B2 | 1/2013 | Zhou et al. | |
| 8,570,844 B1 * | 10/2013 | Yuan | G11B 5/64 360/131 |
| 8,848,307 B2 * | 9/2014 | Seigler et al. | 360/59 |
| 2004/0191578 A1 * | 9/2004 | Chen | G11B 5/653 428/831.2 |
| 2006/0152839 A1 * | 7/2006 | Peng | 360/59 |
| 2008/0170318 A1 | 7/2008 | Suwa et al. | |
| 2009/0303861 A1 | 12/2009 | Shintani | |
| 2009/0310459 A1 | 12/2009 | Gage et al. | |
| 2010/0091618 A1 | 4/2010 | Schabes et al. | |

OTHER PUBLICATIONS http://web.archive.org/web/20120825081648/http://en.wikipedia.org/wiki/Surface_plasmon_polaritons, "Surface plasmon polaritons," Aug. 25, 2012, 4 pages.

* cited by examiner

*Primary Examiner* — Elizabeth Mulvaney
(74) *Attorney, Agent, or Firm* — Westman, Champlin & Koehler, P.A.

(57) ABSTRACT

An apparatus that includes a storage layer and a heating assistance element. The heating assistance element is adjacent to the storage layer or doped into the storage layer. The heating assistance element is configured to enhance spatial confinement of energy from a field to an area of the storage layer to which the field is applied.

21 Claims, 6 Drawing Sheets

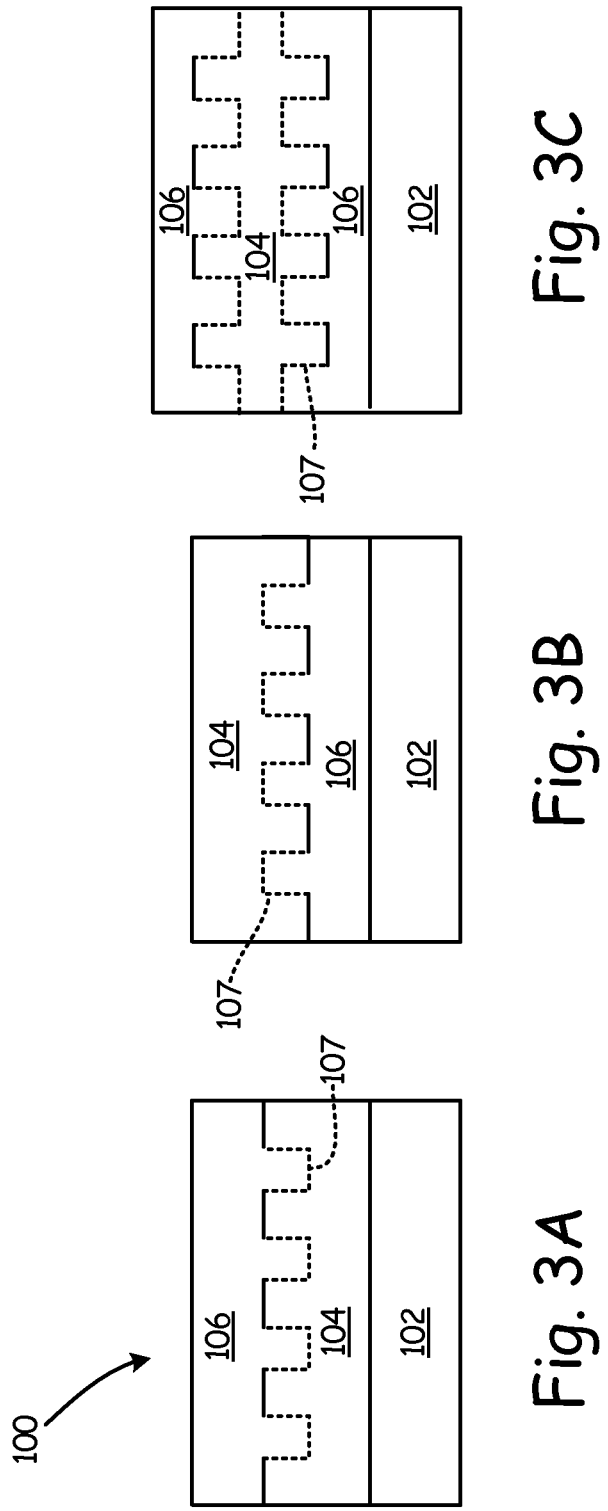

STORAGE MEDIUM WITH LAYER(S) FOR ENHANCED HEATING

BACKGROUND

Data storage systems commonly have one or more data storage media and one or more recording heads that read information from and write information to the data storage media. Data storage media may be magnetic storage media, optical storage media, etc. One technology for meeting a demand of increasing the recording density of magnetic recording is heat assisted magnetic recording (HAMR). In HAMR, information bits are recorded on a data storage medium at elevated temperatures. In one HAMR approach, a beam of light is condensed to an optical spot on the storage medium to heat a portion of the medium and thereby reduce a magnetic coercivity of the heated portion. Data is then written to the reduced coercivity region.

SUMMARY

The present disclosure relates to storage media with layer(s) for enhanced heating.

A first apparatus embodiment includes a storage layer and a heating assistance element adjacent to the storage layer or doped into the storage layer. The heating assistance element is configured to enhance spatial confinement of energy from a field to an area of the storage layer to which the field is applied.

A second apparatus embodiment includes a storage layer and a dielectric layer disposed over the storage layer. The dielectric layer has an electrical conductivity that is less than an electrical conductivity of the storage layer.

A third apparatus embodiment includes a storage layer and a dielectric element. The dielectric element, which is doped into the storage layer, is configured to enhance absorption of energy in the storage layer from an optical field applied to heat the storage layer.

Other features and benefits that characterize embodiments of the disclosure will be apparent upon reading the following detailed description and review of the associated drawings.

BRIEF DESCRIPTION OF THE DRAWINGS

FIGS. 3A, 3B and 3C are side views of a data storage medium in accordance with certain embodiments.

DETAILED DESCRIPTION OF ILLUSTRATIVE EMBODIMENTS

Embodiments described below relate to storage media with heating assistance layer(s) that enhance heating of the storage media. Heating of the storage media may be carried out by, for example, applying radiant energy to the media from any suitable radiant energy source. Examples of radiant energy sources include continuous wave laser sources and pulsed laser sources that provide the radiant energy to the media by producing optical fields, which are directed at the media. Some heating assistance layer(s) are configured to enhance spatial confinement of energy from the optical field to an area of the storage layer to which the optical field is applied. Other heating assistance layer(s) are configured to enhance absorption of energy in the storage layer from the optical field applied to heat the storage layer. The enhanced absorption of energy in the storage layer may be provided in addition to, or instead of, the enhanced spatial confinement of the energy from the optical field.

Figure 1:
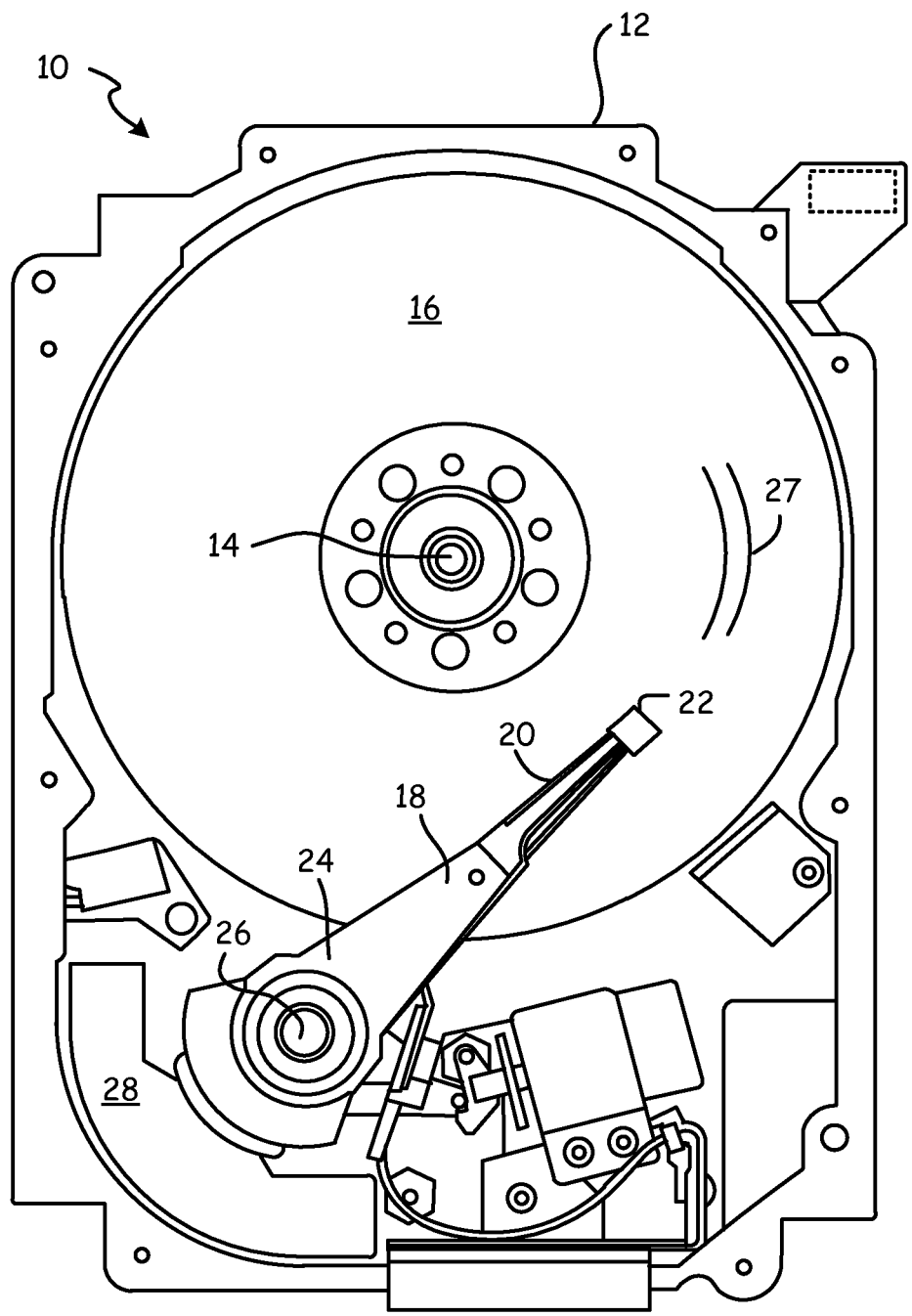
FIG. 1 is a pictorial representation of a disc drive.
Figure 2:
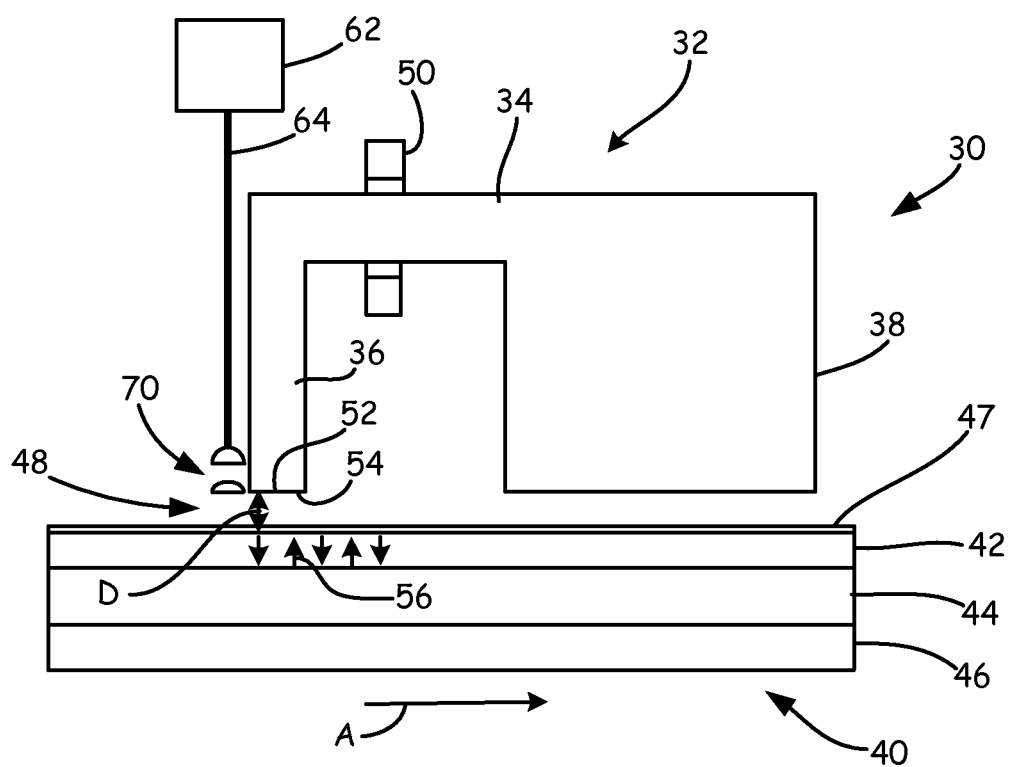
FIG. 2 is a side view of a data storage medium and a recording head, which may be utilized in the disc drive of FIG. 1.

FIGS. 1 and 2 are illustrative operating environments in which certain specific embodiments disclosed herein may be incorporated. The operating environments shown in the figures are for illustration purposes only. Embodiments of the present disclosure are not limited to any particular operating environment such as those shown in FIGS. 1 and 2. Embodiments of the present disclosure are illustratively practiced within any number of different types of operating environments.

FIG. 1 is a pictorial representation of a hard disc drive 10 in which at least some of the present embodiments may be used. Hard disc drives are a common type of data storage system. While embodiments of this disclosure are described in terms of disc drives, other types of data storage systems should be considered within the scope of the present disclosure, such as other storage systems with moving or non-moving storage media.

The disc drive 10 includes a housing 12 (with the upper portion removed and the lower portion visible in this view) sized and configured to contain the various components of the disc drive. The disc drive 10 includes a spindle motor 14 for rotating at least one storage medium (for example, a magnetic storage disc) 16. At least one arm 18 is contained within the housing 12, with the arm 18 having a first end 20 for supporting a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is controlled by a controller, which is not shown in the interest of simplification.

FIG. 2 is a schematic side view of a perpendicular magnetic recording head 30 and a perpendicular magnetic storage medium 40 constructed in accordance with certain embodiments. The present disclosure is not limited to perpendicular recording heads. In this example, the recording head 30 includes a magnetic write head 32 that includes a yoke 34 that forms a write pole 36 and a return pole 38. The recording head 30 is positioned adjacent to the perpendicular magnetic storage medium 40 having a magnetically hard layer 42 and a magnetically soft layer 44 supported by a substrate 46. A bearing (for example, an air bearing) 48 separates the recording head 30 from the storage medium 40 by a distance D. A coil 50 is used to control the magnetization of the yoke 34 to produce a write field at an end 52 of the write pole adjacent to a bearing surface 54 of the write head 32. The recording head 30 can also include a read head, which is not shown in the interest of simplification.

The perpendicular magnetic storage medium 40 is positioned adjacent to or under the recording head 30 and travels in the direction of arrow A. As indicated above, the recording medium 40 includes substrate 46, which may be made of any suitable material such as ceramic glass or amorphous glass. Soft magnetic underlayer 44 is deposited on the substrate 46.

The soft magnetic underlayer 44 may be made of any suitable material such as alloys or multilayers having Co, Fe, Ni, Pd, Pt or Ru, for example. Hard magnetic recording layer 42 is deposited on the soft underlayer 44, with perpendicular magnetic domains 56 contained in the hard layer 42. Suitable hard magnetic materials for the hard magnetic recording layer 42 may include at least one material selected from, for example, FePt or CoCrPt alloys having a relatively high anisotropy at ambient temperature. An overlayer 47 may be provided to enhance absorption of radiation as discussed below in more detail.

The recording head 30 also includes elements for heating the magnetic storage medium 40 proximate to where the write pole 36 applies the magnetic write field to the storage medium 40. Specifically, the components for heating include an optical fiber 64 which acts in association with a source 62 of radiant energy and is in optical communication with an optical coupling structure 70. The radiant energy can be, for example, visible light, infrared, ultra violet or other radiation. The transmitted radiant energy passes from the optical coupling structure 70 to the surface of the storage medium 40 for heating a localized area of the storage medium 40, and particularly for heating a localized area of the hard magnetic layer 42.

The source 62 may be, for example, a laser diode, or other suitable light source. At the surface of the medium 40, the radiant energy is converted into heat in the medium 40. The coupling structure 70 may be spaced apart from the medium 40 and, more specifically, spaced apart from the hard magnetic layer 42, by a distance of about 2 nm to about 50 nm. It will be appreciated that the separation distance is also dependent on the fly height required to maintain acceptable reading and writing (electromagnetic coupling for heating) by the recording head 30. Other separation distances can be selected as desired. The write head 32 of FIG. 2 allows for heating of the recording medium 40 in close proximity to the write pole 36, which applies a magnetic write field to the recording medium 40. Locating the optical coupling element 70 adjacent to the write pole 36, may provide for increased writing efficiency due to the write field being applied immediately down track from where the recording medium 40 has been heated. The hot spot may raise the temperature of the medium 40 from, for example, ambient temperature to approximately 200° C., for example. The recording takes place at the thermal profile, which can also be called the thermal field or the thermal distribution, in the medium 40 for which the coercivity may be equal to the applied recording field. This thermal profile may be near the edge of the write pole 36 where the magnetic field gradients may be the largest. This may record a substantially sharp magnetic field transition in the medium 40. An optical waveguide (not shown) may be integrally formed with the write pole 36 or may be implemented in any other desired relationship with the write pole 36 to direct the radiant energy toward the medium 40.

In operation, the recording medium 40 passes under the recording head 30, in the direction indicated by arrow A in FIG. 2. The source 62 transmits radiant energy via the optical fiber 64 to the optical coupling element 70. The optical coupling element 70 transmits the optical energy for heating the storage medium 40. More specifically, a localized area of the recording layer 42 is heated to lower the coercivity prior to the write pole 36 applying a magnetic write field to the recording medium 40. This may allow for higher coercivity storage media to be used while limiting superparamagnetic instabilities that may occur with such recording media used for high recording densities.

At a down-track location from where the medium 40 is heated, the magnetic write pole 36 applies a magnetic write field to the medium 40 for storing magnetic data in the recording medium 40. The write field is applied while the recording medium 40 remains at a sufficiently high temperature for lowering the coercivity of the recording medium 40. This may help the write pole 36 to provide a sufficient or high enough magnetic write field to perform a write operation on the recording medium 40.

The heating area in the storage layer determines the dimensions of the data bit. In order to achieve high areal data density, it is useful to achieve high optical power coupling efficiency.

Embodiments described below provide at least one heating assistance layer to enhance absorption or coupling efficiency of radiation used to locally heat the storage medium.

FIGS. 3A, 3B and 3C illustrate a data storage medium 100, which includes at least one heating assistance layer that can be positioned at different locations in the data storage medium 100 to enhance absorption or coupling efficiency of radiation used to heat the data storage medium 100. As can be seen in FIGS. 3A, 3B and 3C, data storage medium 100 includes a substrate 102, a storage layer 104 and at least one heating assistance layer 106. It should be noted that data storage medium 100 can include one or more additional layers that are not shown in the figures in the interest of simplification. For example, storage layer 104 may comprise a hard magnetic layer and a soft magnetic layer such as those discussed with reference to FIGS. 1 and 2, which are not separately shown in FIGS. 3A, 3B and 3C. In FIG. 3A, heating assistance layer 106 is disposed on top of storage layer 104. In FIG. 3B, heating assistance layer 106 in interposed between substrate 102 and storage layer 104. In certain embodiments, heating assistance layer 106 may be interposed between the hard magnetic layer (not shown in FIGS. 3A, 3B and 3C) and the soft magnetic layer (not shown in FIGS. 3A, 3B and 3C) of storage layer 104. FIG. 3C includes multiple heating assistance layers 106. A first one of the multiple heating assistance layers 106 is disposed on top of the storage layer 104 and a second one of the multiple heating assistance layers 106 is interposed between storage later 104 an substrate 102 and/or between heating assistance layer 106 and substrate 102. It should be noted that one or more additional layers (not shown) may be interposed between heating assistance layer 106 and storage layer 104. In some embodiments, at least a portion of heating assistance layer 106 may doped into storage layer 104. Portions of heating assistance layer 106 that may be doped into storage layer 104 are shown with dashed lines 107. In certain embodiments, the entire heating assistance layer 106 is doped into storage layer 106 to form a composite layer. In some embodiments, heating assistance layer is a laminated structure, which is a combination of different layers formed of different materials. Heating assistance layer 106 can be, for example, a few nanometers (nm) thick (for example, about 2 nanometers thick) and can be formed of any suitable material or combination of materials. Examples of suitable materials for heating assistance layer 106 are provided below in connection with FIGS. 4A, 4B, 5A and 5B.

Figure 4A:
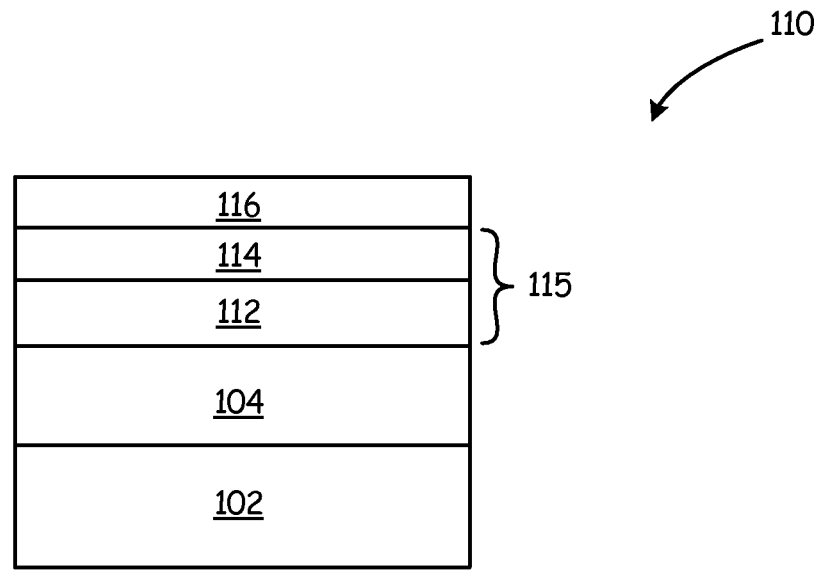
FIGS. 4A and 4B are side views of a data storage medium in accordance with one embodiment.

FIG. 4A illustrates an embodiment of a data storage medium 110 that includes a heating assistance layer 112 that comprises a dielectric material. Dielectric heating assistance layer 112 is illustratively a heating assistance layer such as 106 in FIGS. 3A, 3B and 3C. In the embodiment of FIG. 4A, in addition to substrate 102, storage layer 104 and heating assistance layer 112, data storage medium 110 may include a carbon overcoat layer 114 and a lubricant layer 116. Of course, other layers may also be included in data storage medium 110. In addition to providing heating assistance, dielectric layer 112 may serve the purpose of an overcoat and therefore layers 112 and 114 may form a laminated overcoat 115. In certain embodiments, overcoat layer 114 may be entirely eliminated.

Figure 4B:
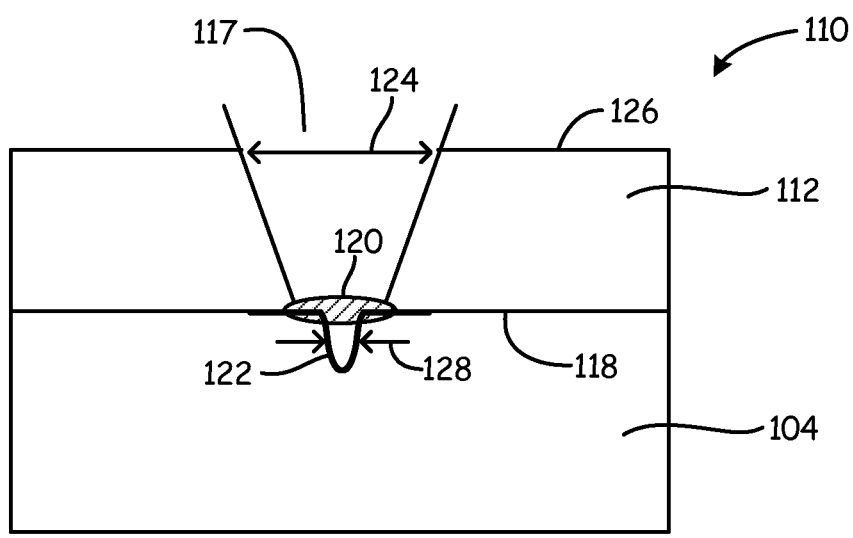

FIG. 4B illustrates how the dielectric layer 112 assists in the heating of storage layer 104.

In the interest of simplification, layers of data storage medium 110 other than storage layer 104 and dielectric layer 112 are not shown FIG. 4B. FIG. 4B shows a laser beam 117 incident on data storage medium 110. Dielectric layer 112 enhances a local field intensity of the laser beam 117 and confines laser beam 117 to a spot size that may be substantially smaller than a spot size obtained in a certain other designs. A reduction in the spot size is achieved, for example, due to a generation of surface plasmon polaritons (SPPs) at an interface 118 of dielectric layer 112 and storage layer 104 when beam 117 is incident on the interface 118. In some embodiments, for SPPs to be generated, an electrical conductivity of dielectric layer 112 should be lower than an electrical conductivity of storage layer 104. In one embodiment, SPPs are generated when dielectric layer 112 has a conductivity of about $1.5 \times 10^{-3}$ siemens/meter and storage layer 104 has a conductivity of about $2 \times 10^7$ siemens/meter. In such an embodiment, a thickness of the dielectric layer may be about 1 nanometer and a thickness of layer 104 may be about 5 nanometers to 30 nanometers. Other embodiments may use dielectric layers 112 having thicknesses greater than 1 nanometer. SPPs, which are designated by reference numeral 120, exhibit a smaller wavelength and a higher field strength than incident laser beam 117. The smaller wavelength and the higher field strength of the SPPs "channel" incident laser beam 117 into a relatively small spot 122 within storage layer 104. As can be seen in FIG. 4B, incident laser beam 117 has a first spot size/area 124 proximate to a first surface 126 of dielectric layer 112 and a second, substantially smaller, spot size/area 128 proximate to the interface 118 of dielectric layer 112 and storage layer 104. A heat/power per unit area from beam 117 provided to area 124 is substantially lower than a heat/power per unit area from beam 117 at area 128, which is greater due to the effect of the SPPs. As a result of the beam channeling effect of the SPPs, a power of the incident laser beam 117 and a power of a corresponding laser source (for example, source 62 of FIG. 2) can be reduced while maintaining a same heating effect on storage layer 104. This, in turn, reduces heat generation within a body of a slider that carries a head such as 30 of FIG. 2, which heats a data storage medium such as 110.

As noted above in connection with the description of FIG. 4A, dielectric layer 112 and overcoat layer 114 constitute laminated overcoat 115. In such embodiments, overcoat layer 114 may comprise a semi-conductive amorphous carbon layer. Dielectric layer 112 may either be a carbon film with a large optical band gap or a hard coating without any carbon-containing materials. Of course, other suitable materials for overcoat layer 114 and dielectric layer 112 may also be used. An optical band gap of a carbon film may be increased by increasing a four-fold bonding ratio in a carbon structure. This may be achieved by at least one of altering a chemical composition of the carbon structure or using suitable energy deposition techniques. For example, in some embodiments, suitable material for dielectric layer 112 may be obtained by utilizing foreign elements such as H or F (or any other suitable elements) to break carbon-carbon (C—C) double bonds and thereby form four-fold bonds with carbon atoms.

Figure 4C:
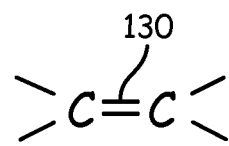
FIGS. 4C, 4D and 4E are diagrammatic illustrations showing chemical structures of a heating assistance layer that may be utilized in the embodiment of FIGS. 4A and 4B.
Figure 4D:
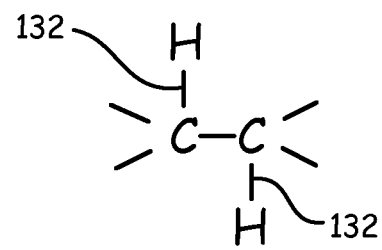
Figure 4E:
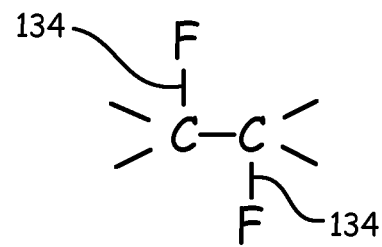

FIGS. 4C, 4D and 4E illustrate a conversion of a carbon-carbon double bond to a four-fold bond in accordance with one embodiment. FIG. 4C illustrate a C—C double bond 130 in graphite, for example. When carbon double bond atoms are exposed to hydrogen (H) or fluorine (F), for example, under suitable conditions, H or F reacts with the C—C double bond atoms to break the double bond(s) 130 and form single C—H or C—F bonds. The C—H bonds are designated by reference numeral 132 in FIG. 4D, and the C—F bonds are designated by reference numeral 134 in FIG. 4E.

Energy deposition techniques for converting carbon-carbon double bonds to four-fold bonds include chemical vapor deposition, physical vapor deposition, ion-beam deposition, etc., which are carried out in high vacuum chambers. During such deposition, charged or non-charged carbon particles comprising carbon-carbon double bonds are generated and directed to a substrate upon which the particles form a dense film that comprises four-fold carbon bonds.

Non-carbon hard coatings for dielectric layer 112 may comprise metal oxides (for example, chromium oxide and aluminum oxide), polytetrafluoroethylene (PTFE) films, silicon dioxide as well as certain ceramics, for example. Different types of non-carbon dielectric layers are described further below.

The heating assistance layer 112 described above in connection with FIG. 4A is configured to enhance spatial confinement of the energy from the optical field to the area of the storage layer to which the optical field is applied. Heating assistance layers described below are configured to enhance absorption of energy in the storage layer from the optical near field applied to heat the storage layer. It should be noted that, in the embodiments described below, the enhanced absorption of energy in the storage layer may be provided in addition to, or instead of, the enhanced spatial confinement of the energy from the optical near field.

An ability of a material to absorb energy from an optical field, for example, is related to a refractive index or index of refraction of the material. The refractive index, which is a dimensionless number, may have both real and imaginary components. In the present application, the real component of the refractive index is represented by n and the imaginary component of the refractive index is designated by k. When a layer of material having suitable n, k and thermal conductivity values is added proximate (or adjacent) to a storage layer comprising FePt, for example, MH (media to head temperature ratio) and TG (thermal gradient (down-track)) values of the storage layer are substantially increased and CW80 (cross-track thermal spot width at 80% maximum) of the storage layer is substantially decreased. A high MH value leads to lower head temperature and therefore better reliability and performance of the recording head. A high TG is desired for high areal density and better performance. For reasons provided above, a smaller thermal spot size on the medium, and therefore a smaller CW80, is desired. Without the inclusion of the layer having the suitable n, k and thermal conductivity values, MH for the storage layer may be about 3, TG for the storage layer may be about 4 Kelvin/nanometer and CW80 for the storage layer may be about 100 nanometers. Adding a layer of material having n~1.5, k between 0.5 and 2 and thermal conductivity of 1-5 watts per meter kelvin (W/m-K), increases MH of the storage layer by about 13%, increases TG of the storage layer by about 20% and reduces CW80 of the storage layer by about 20%. These material properties for such a heating assistance layer may be achieved by, for example, combining a metal and a dielectric and forming a composite material. For example, 50% Ta and 50% TaO results in n=1.55 and k=1.85. Suitable combinations of Ta and other dielectrics such as $SiO_2$, SiO, SiN, SiON and TiO may also be used for the heating assistance layer. A large percentage of a dielectric material having a low thermal conductivity keeps thermal conductivity low in the heating assistance layer. For example, 20% Ta in SiON results in n between 1.6 and 1.7 and k~0.75. Another example for a composite material for the heating assistance layer is a combination of tantalum and palladium. A layer of tantalum or palladium having a thickness of about 830 nanometers has an n value of about 2.1. An amount of palladium in a composite heating assistance layer of palladium and tantalum can be regulated to obtain a suitable k value. For example, ~20% of palladium in such a composite heating assistance layer results in a k value of about 1 for the composite layer. Instead of using a separate composite heating assistance layer disposed on the storage layer, in some embodiments, a dielectric material without any metal may be doped into the storage layer to enhance heat absorption in the storage layer. Also, in certain embodiments, instead of a composite material, a multilayer having separate dielectric and metal layers may be disposed on the storage layer to enhance heat absorption in the storage layer.

Figure 5A:
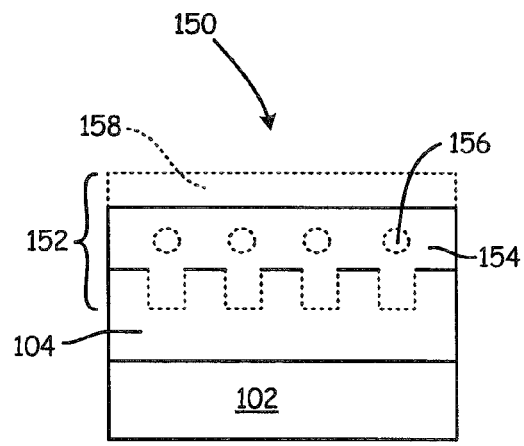
FIGS. 5A and 5B are side views of a data storage medium in accordance with other embodiments.
Figure 5B:
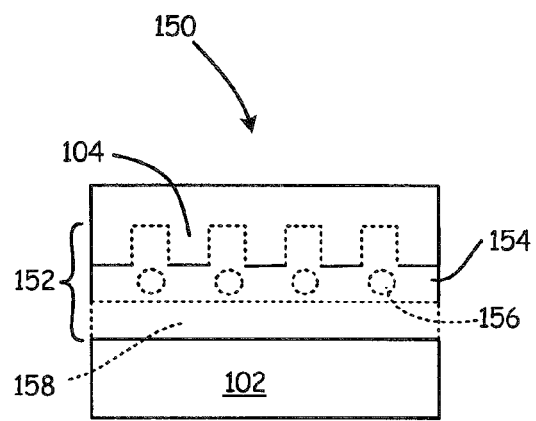

FIG. 5A illustrates an embodiment of a data storage medium 150 that includes a heating assistance layer 152 that is configured to enhance absorption of energy in storage layer 104 from an optical field applied to heat the storage layer 104. Heating assistance layer 152 is illustratively a heating assistance layer such as 106 in FIGS. 3A, 3B and 3C. In one embodiment, storage layer 104 may be a magnetic storage layer that comprises FePt, for example. In other embodiments, storage layer 104 may comprise any other suitable magnetic and/or non-magnetic materials. Storage layer 104 is disposed on substrate 102. In some embodiments, heating assistance layer 152 comprises a dielectric material or layer 154 that is at least partially doped into the storage layer 104. In other embodiments, heating assistance layer is a composite layer of dielectric material 154 and at least one metal 156. In still other embodiments, heating assistance layer comprises both a dielectric layer 154 and a separate metal layer 158 disposed on the dielectric layer. In some embodiments in which the dielectric material 154 is doped into the storage layer, no metal(s) 156 or metal layer(s) 158 may be used in heating assistance layer 152. In such embodiments, storage layer 104 can comprise FePt, for example, and the dielectric material 154 can comprise SiO2, for example. The composite storage layer 104 of FePt (or other suitable storage layer material) and SiO2 (or other suitable dielectric material) can comprise between 40%-80% by weight of SiO2 (or other suitable dielectric material) in FePt (or other suitable storage layer material) to obtain suitable n and k values and thereby enhance the absorption of energy in storage layer 104. It should be noted that, in other embodiments, heating assistance layer 152 may be positioned between storage layer 104 and substrate 102. Such an embodiment is shown in FIG. 5B. It should be noted that, in the embodiments shown in FIGS. 5A and 5B, additional layers (not shown) may be interposed between heating assistance layer 152 and storage layer 104 and/or interposed between heating assistance layer 152 and substrate 102.

Figure 6:
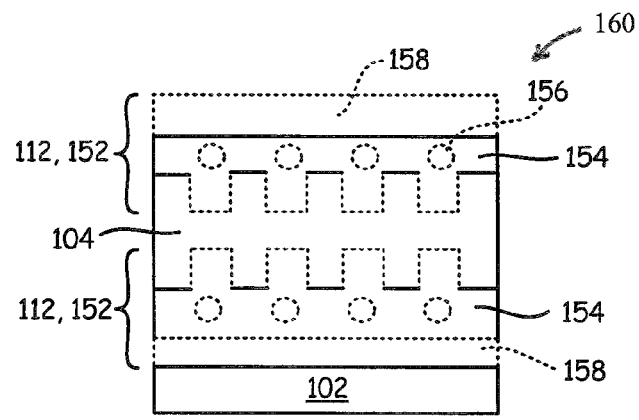
FIG. 6 is a side view of a data storage medium that incorporates features of two or more of the embodiments shown in FIGS. 4A, 5A and 5B.

FIG. 6 illustrates an embodiment of a data storage medium 160 that incorporates features of two or more of the embodiments shown in FIGS. 4A, 5A and 5B. In data storage medium 160, heating assistance layer 112, 152 comprises a material that has an electrical conductivity that is lower than an electrical conductivity of storage layer 104. Thus, for reasons provided in connection with FIG. 4A, heating assistance layer 112, 152 enhances spatial confinement of energy from an optical field to an area of the storage layer 104 to which the optical field is applied. Also, the material of heating assistance layer 112, 152 may have n, k and thermal conductivity values that are suitable for enhancing absorption of energy in storage layer 104 from an optical field applied to heat the storage layer 104.

Although various uses of the heating assistance layer are disclosed in the application, embodiments are not limited to those disclosed in the application. It is to be understood that even though numerous characteristics of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the elements may vary depending on the application for the heating assistance layer while maintaining substantially the same functionality without departing from the scope and spirit of the present disclosure. In addition, although the embodiments described herein are directed to heating assistance layers utilized in a certain data storage systems, it will be appreciated by those skilled in the art that the teachings of the present disclosure can be applied to other data storage devices, such as optical devices, without departing from the scope and spirit of the present disclosure. Further, the teachings of the present disclosure can be applied to longitudinal recording media. In addition to the above-described techniques for heating the storage media, other suitable techniques such as microwave heating may be used to heat the media.

What is claimed is:

1. An apparatus comprising:
   a storage layer; and
   a heating assistance element, adjacent to the storage layer, configured to enhance spatial confinement of energy from a field to an area of the storage layer to which the field is applied, wherein the heating assistance element comprises a dielectric layer and a metal layer that is separate from the dielectric layer.

2. The apparatus of claim 1 and wherein the heating assistance element is further configured to enhance absorption of the energy in the storage layer from the applied field.

3. The apparatus of claim 1 and wherein an electrical conductivity of the dielectric layer is less than an electrical conductivity of the storage layer.

4. The apparatus of claim 1 and wherein the storage layer is a magnetic storage layer.

5. The apparatus of claim 4 and wherein the magnetic storage layer comprises FePt.

6. The apparatus of claim 5 and wherein the dielectric layer comprises at least one of TaO, $SiO_2$, SiO, SiN, SiON, TiO or a carbon film with a large optical band gap.

7. The apparatus of claim 1 and further comprising an overcoat layer disposed over the dielectric layer, wherein the overcoat layer and the dielectric layer form a laminated overcoat.

8. The apparatus of claim 7 and wherein the overcoat layer comprises a semi-conductive amorphous carbon layer.

9. An apparatus comprising:
   a storage layer; and
   a dielectric layer disposed over the storage layer, the dielectric layer having an electrical conductivity that is less than an electrical conductivity of the storage layer, wherein the dielectric layer comprises a carbon film with increased four-fold bonds, and wherein a surface of the dielectric layer disposed over the storage layer and a surface of the storage layer that contacts the surface of the dielectric layer provide a heat-enhancing interface.

10. The apparatus of claim 9, wherein an optical field is applied to heat an area of the storage layer via the dielectric layer, and wherein the interface between the dielectric layer and the storage layer is configured to enhance spatial confinement of the energy from the optical field to the area of the storage layer to which the optical field is applied.

11. The apparatus of claim 10 and further comprising an optical field coupling structure configured to apply the optical field to heat the area of the storage layer via the dielectric layer.

12. The apparatus of claim 10 and wherein the dielectric layer is further configured to enhance absorption of energy in the storage layer from the optical field applied to heat the storage layer.

13. The apparatus of claim 9 and wherein the storage layer is a magnetic storage layer.

14. An apparatus comprising:
a storage layer; and
a dielectric element, doped into the storage layer, configured to enhance absorption of energy in the storage layer from an optical field applied to heat the storage layer, wherein the dielectric element comprises a carbon film with increased four-fold bonds.

15. The apparatus of claim 14, and wherein an electrical conductivity of the dielectric element is less than an electrical conductivity of the storage layer.

16. The apparatus of claim 14 and wherein the storage layer is a magnetic storage layer.

17. The apparatus of claim 16 and wherein the magnetic storage layer comprises FePt.

18. An apparatus comprising:
a storage layer; and
a heating assistance element, adjacent to the storage layer or doped into the storage layer, that is configured to increase spatial confinement of energy from a beam to an area of the storage layer to which the beam is applied by facilitating a generation of surface plasmon polaritons (SPPs) in a path of the beam, the SPPs increasing a heat/unit area provided by the beam to the storage layer,
wherein the heating assistance element comprises a carbon film with increased four-fold bonds.

19. The apparatus of claim 18, wherein:
an electrical conductivity of the heating assistance element is less than an electrical conductivity of the storage layer, and
the electrical conductivity of the heating assistance element being less than the electrical conductivity of the storage layer facilitates the generation of the SPPs in the path of the beam.

20. The apparatus of claim 18, wherein the heating assistance element comprises a material having a thermal conductivity value and a refractive index value selected to increase absorption of the energy in the storage layer from the applied field by increasing a thermal gradient value of the storage layer.

21. The apparatus of claim 1 and wherein the heating assistance element is deposited over the storage layer.

* * * * *